(12) United States Patent
Qian et al.

(10) Patent No.: US 9,607,597 B2
(45) Date of Patent: Mar. 28, 2017

(54) PARTICULATE SOUND ABSORPTION BOARD AND PREPARATION METHOD THEREOF

(71) Applicant: SICHUAN ZISEN ACOUSTICS TECHNICAL CO., LTD., Chengdu, Sichuan (CN)

(72) Inventors: Weixin Qian, Sichuan (CN); Jiashu Shen, Sichuan (CN)

(73) Assignee: SICHUAN ZISEN ACOUSTICS TECHNICAL CO., LTD., Chengdu, Sichuan (CN)

(*) Notice: Subject to any disclaimer, the term of this patent is extended or adjusted under 35 U.S.C. 154(b) by 0 days.

(21) Appl. No.: 14/986,098

(22) Filed: Dec. 31, 2015

(65) Prior Publication Data

US 2016/0111076 A1    Apr. 21, 2016

Related U.S. Application Data

(63) Continuation-in-part of application No. PCT/CN2014/089802, filed on Oct. 29, 2014.

(30) Foreign Application Priority Data

Jul. 22, 2014 (CN) .......................... 2014 1 0347735

(51) Int. Cl.
    *G10K 11/165* (2006.01)
    *C04B 26/12* (2006.01)
    (Continued)

(52) U.S. Cl.
    CPC .......... *G10K 11/165* (2013.01); *B29C 67/243* (2013.01); *C04B 20/1037* (2013.01);
    (Continued)

(58) Field of Classification Search
    CPC .. G10K 11/165; B29C 67/243; C04B 38/0038
    (Continued)

(56) References Cited

U.S. PATENT DOCUMENTS

| 6,664,205 B2 * | 12/2003 | Oda ........................ C04B 28/26 |
| | | 252/62 |
| 2012/0100289 A1 * | 4/2012 | Egan ..................... B05B 7/1495 |
| | | 427/196 |

FOREIGN PATENT DOCUMENTS

| CN | 1207790 A | 2/1999 |
| CN | 1404459 A | 3/2003 |

(Continued)

*Primary Examiner* — Jeremy Luks
(74) *Attorney, Agent, or Firm* — Novick, Kim & Lee, PLLC; Allen Xue (57) ABSTRACT

A particulate sound absorption board and its preparation method. The said particulate sound absorption board consists of binding agent and sound absorption particle; the external surface of sound absorption particle is covered with a layer of binding agent, and the angularity coefficient of particle covered with binding agent is less than 1.3; the said sound absorption particle consists of skeleton particle and filling particle, in which the former is used for sound absorption board skeleton, and the latter flows into the pore between skeleton particles to form sound absorption pore, and the average diameter of cross section of sound absorption pore is 0.07 mm. The two-stage manufacturing technology (i.e. coating, curing and then shaping) is adopted for the said preparation method to prevent the pore between particles from being blocked by excess binding agent, and further improve the angularity coefficient of particle.

13 Claims, 6 Drawing Sheets

(51) Int. Cl.
  *C04B 26/14*  (2006.01)
  *C04B 26/10*  (2006.01)
  *C04B 38/00*  (2006.01)
  *C04B 20/10*  (2006.01)
  *B29C 67/24*  (2006.01)
  *C04B 111/52* (2006.01)

(52) U.S. Cl.
  CPC ............ *C04B 26/105* (2013.01); *C04B 26/12* (2013.01); *C04B 26/14* (2013.01); *C04B 38/0038* (2013.01); *C04B 2111/52* (2013.01); *Y02W 30/95* (2015.05)

(58) Field of Classification Search
  USPC .................................... 501/80; 181/286, 288
  See application file for complete search history.

(56) References Cited

FOREIGN PATENT DOCUMENTS

| | | |
|---|---|---|
| CN | 102398030 A | 4/2012 |
| CN | 102826824 A | 12/2012 |
| CN | 103897287 A | 7/2014 |

\* cited by examiner

PARTICULATE SOUND ABSORPTION BOARD AND PREPARATION METHOD THEREOF

CROSS-REFERENCE TO RELATED APPLICATIONS

This application is a continuation in part application of PCT application PCT/CN2014/089802, filed on Oct. 29, 2014, which claims the benefit of priority from Chinese Patent Application No. 201410347735.1, filed on Jul. 22, 2014, the content of which is incorporated herein by reference in its entirety.

TECHNICAL FIELD

This invention relates to the building sound absorption material, especially to a particulate sound absorption board and preparation method.

BACKGROUND OF THE INVENTION

Sound absorption material refers to the material that can absorb the incident sound under the action of its porosity, thin film or resonance, and can be divided into porous sound absorption material and resonance sound absorption structure based on its physical property and sound absorption way. The structural feature of porous sound absorption material is that there are a large number of interconnected and outward micropores in the material, and its sound absorption principle is that the entry of sound wave into the material pore will vibrate tiny fibers of air and material in the pore, and result in friction and viscous resistance, and sound energy is converted into heat energy and absorbed. Fiber material and plaster material are widely used in the engineering, in which the former includes glass wool, mineral wool or various sound absorption boards or sound absorption components mainly made from such materials; the latter includes microporous brick and particulate slag sound absorption brick.

Porous plaster sound absorption material has many varieties, and is divided into slag sound absorption brick, expanded perlite sound absorption brick, pottery clay sound absorption brick and environmentally-friendly sandstone sound absorption board, etc. due to the difference of raw materials. Although the said sound absorption material has many varieties, such materials are not widely applied for its low porosity, low sound absorption coefficient and unsatisfactory sound absorption effect due to the limitation of manufacturing method, pore-forming mechanism and structure strength. For example, the patent (application no.: 201210398344.3) discloses an environmentally-friendly sandstone sound absorption board which is that natural round sand or natural colorful round sand and epoxy resin glue are pressed as the board after mixture to form the base layer, and expanded perlite particle and epoxy resin glue are pressed on the board after mixture to form the light material layer on which the gridding cloth is pressed to act as tensile strength and skeleton. The said sound absorption board is composed of four-layer structure, i.e. base layer, light material layer, gridding cloth layer and decoration surface layer, and featured by complicated structure, plenty of manufacturing processes and high cost. The pore-forming mechanism of base layer and light material layer in the environmentally-friendly sandstone sound absorption board is that the natural pore arising from the evaporation of water molecule and the curing of epoxy resin glue plays a role in sound absorption. Since the pore arising from the evaporation of water molecule is intermittent and random, the porosity is unpredictable, and most of pores arising from the evaporation of water molecule are closed pores that can't ventilate and store air. Such closed pore does not have sound absorption function, so its sound absorption coefficient is uncertain, and sound absorption effect is unsatisfactory. The dosage of binding agent is increased with the increase in specific surface area between sands due to the irregularity of external surface of the sand, so the cost of the said sound absorption board remains high, and its promotion and application are also affected.

The shortcomings above still need to be improved.

SUMMARY OF THE INVENTION

The purpose of this invention is to provide a particulate sound absorption board and its preparation method based on the shortage of prior art, which can guarantee the structure strength of sound absorption board, improve the sound absorption coefficient of sound absorption board, and obtain better sound absorption effect.

In order to achieve the above purpose, this invention provides a particulate sound absorption board which is composed of binding agent and sound absorption particle. The external surface of sound absorption particle is covered with a layer of binding agent, and the angularity coefficient of sound absorption particle covered with binding agent is less than 1.3; the said sound absorption particle consists of skeleton particle and filling particle, in which the former is used for sound absorption board skeleton, and the latter flows into the pore between skeleton particles to form sound absorption pore.

Further, the average diameter of cross section of the above sound absorption pore is 0.06-0.09 mm, preferably 0.07 mm.

Further, the diameter of the said skeleton particle is 0.8-1 mm, and the diameter of the said filling particle is 0.15 mm; the weight ratio of the said skeleton particle and filling particle is 80-90:10-15. In order to select more particles with angularity coefficient of less than 1.5, and improve the speed of material selection, the said sound absorption particle is selected from sand, ceramsite and recycled building waste particle.

To guarantee the binding strength and cohesive force of particles, the said binding agent is extracted from epoxy resin, phenolic resin, urea resin and furfuryl alcohol resin.

The particulate sound absorption board of this invention is formed by splicing two kinds of particles of different diameters, and its sound absorption mechanism is that the entry of sound wave into the sound absorption board produces friction between the air in the pore and the external surface of particle, and the sound energy is converted into heat energy through friction, and the consumption of sound energy can be promoted with the increase in the length of pore so as to improve sound absorption effect. As we know, the pore formed between particles is divided into closed pore, semi-connected pore and connected pore. Closed pore can't store air and ventilate, and does not have sound absorption function, so semi-connected pore and connected pore should be preferred for the purpose of achieving better sound absorption effect. The particulate sound absorption board provided in this invention has such excellent sound absorption structure, and its skeleton is formed by closely splicing skeleton particles (larger diameter particles), and the pore between skeletons is filled with filling particles (smaller diameter particles) so as to form a specific micropore structure required for sound absorption. When micropore diameter of such structure is 0.07 mm, the structure has excellent sound absorption property, including connected pore that can store air and ventilate and semi-connected pore that can store air, but can't ventilate.

According to the experimental analysis and research conducted by the inventor for a long time, there are three factors affecting the sound absorption property of particulate sound absorption board, i.e. length, shape (width) and quantity of pore formed between particles. The length of pore is related to the thickness of sound absorption board which has an influence on sound absorption effect when the shape of pore in the particulate sound absorption board is determined. The thicker the particle board is, the greater the flow resistance, and the larger the sound absorption bandwidth. In view of economy and application range, the thickness of particle board is better 10 mm~50 mm.

Figure 5:
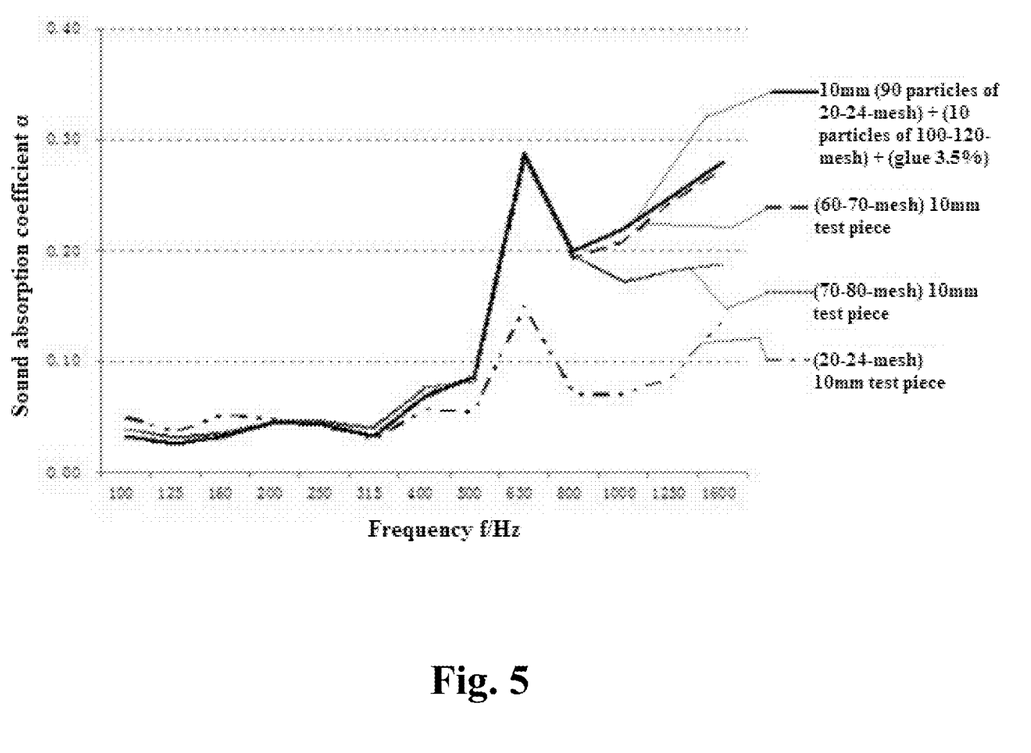
FIG. 5 is the comparison diagram of sound absorption coefficient of mixed particulate sound absorption board and particulate sound absorption board of the same diameter.
Figure 7:
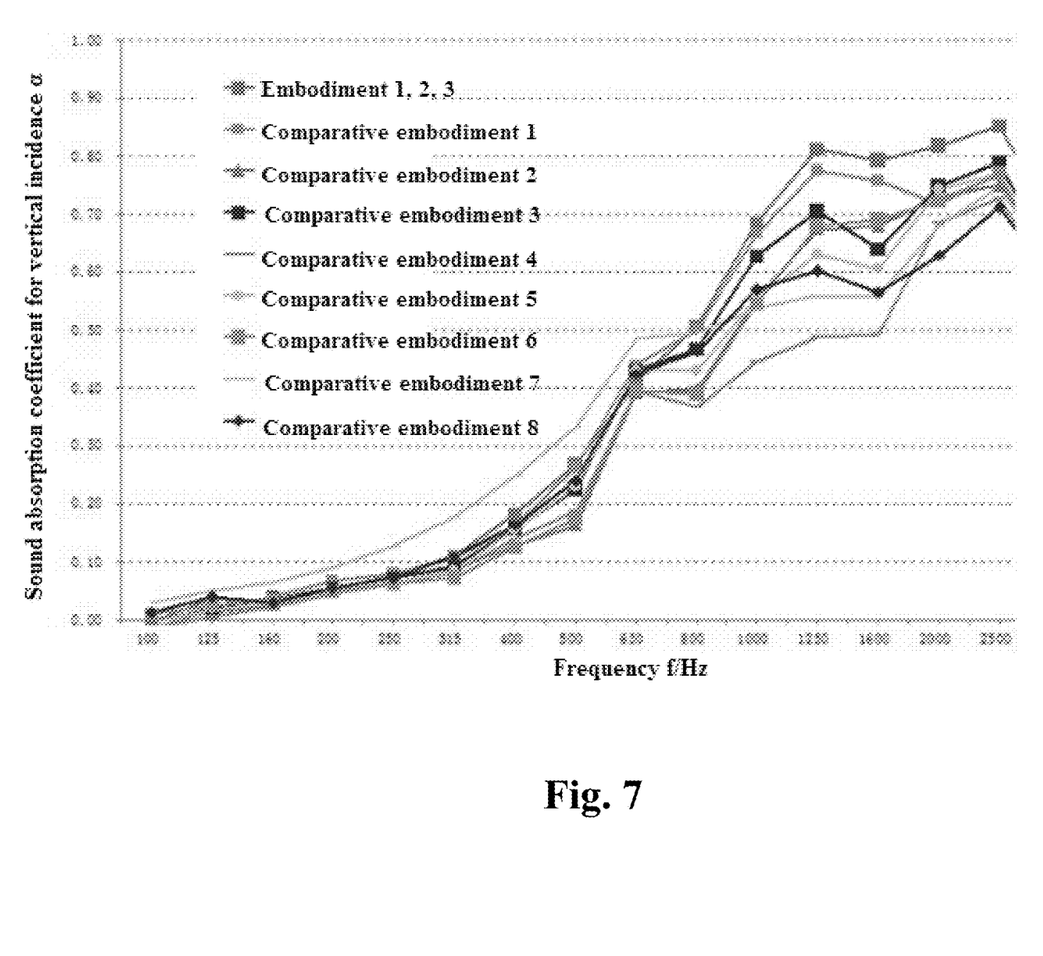
FIG. 7 is the comparison diagram of sound absorption coefficient of embodiments 1-3 and comparative embodiments 1-8 of this invention.

When particles of the same diameter are used, the total porosity formed is fixed, i.e. 0.472, which is nothing to do with particle diameter. It is just that the pore between particles is narrowed down with the decrease in particle diameter, and the number of pores is increasing, but the porosity is unchanged, which means the porosity limit of sound absorption board formed by closely splicing particles is 0.472. Sound absorption effect, however, is not the best when the porosity is maximized. As shown in FIG. 5, the sound absorption property of sound absorption board made from particles of the same diameter is featured by poor low frequency and better high frequency. Similarly, as shown in FIG. 5, the width of pore formed between particles has an influence on sound absorption effect, and the wider the pore formed between larger diameter particles is, the better the low frequency sound absorption effect, and the narrower the pore formed between smaller diameter particles is, the better the high frequency sound absorption effect. Hence, the shape and quantity of pore will affect the sound absorption frequency band and bandwidth. To ensure the sound absorption board has better high and low frequency sound absorption effect, the inventor finds through a lot of researches and experiments that the pore formed between large particles is cut into three small pores by small particle by filling small diameter particles into large diameter particles so as to ensure pores are interconnected, bent and straight, which can increase the length of pore, and obtain pores of different shapes so as to achieve better sound absorption property, as shown in FIG. 7.

Figure 6:
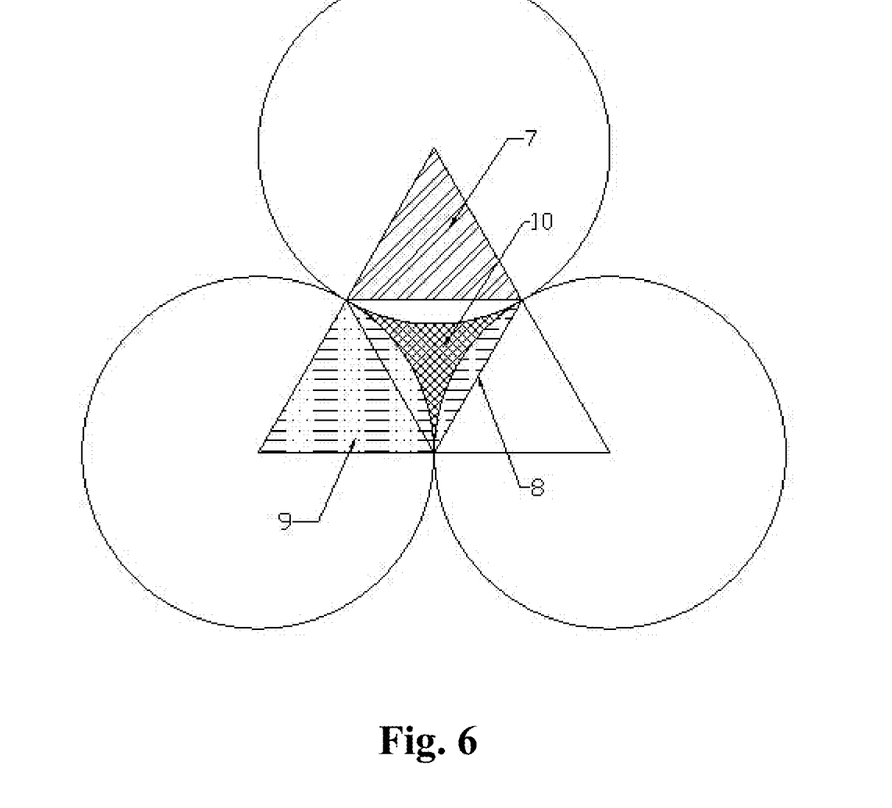
FIG. 6 is the schematic diagram of particle pore.

When particles of the same diameter are used, its pore is formed between five mutually contacted particles. Theoretically, the maximum cross section area $S_x$ of the said pore 10 should be the cross section area of the pore formed between three mutually contacted particles, as shown in FIG. 6. The theoretical calculation method of such cross section area is as follows.

$$S_x = \text{(triangle area } S\text{)} - 3 \times \text{arch area } S_1$$

(1) The triangle 7 is a congruent triangle, and three interior angles are 60°, $$S = (R \times \text{CON}30°) \times (R \times \text{SIN}30°) = 0.433R^2$$

(2) Arch 8 area $S_1$=(sector 9 area)−(triangle 7 area $S$)

$$\text{Sector 9 area} = (60/360) \times 3.14 \times R = 0.523R^2$$

$$S_1 = (0.523 - 0.433)R^2 = 0.09\ R^2$$

(3) Pore 10 area $S_x$ $$S_x = S - 3 \times S_1 = (0.433 - 3 \times 0.09)R^2 = 0.163\ R^2$$

R—particle radius

Hence, the area of pore is directly proportional to the square of particle radius, which means the larger the particle diameter is, the greater the area of pore formed.

After several experiments, the inventor finds that the sound absorption coefficient of φ0.3 mm (60-70-mesh screen) sand is relatively better when the sound absorption board is made from particles of the same diameter. According to the above formula, the area $S_x$ of such pore is 0.163 $R^2$=0.163×0.15×0.15=0.00367 mm$^2$, and its diameter is 0.069 mm.

When small diameter particles are inserted into large diameter particles, we know through calculation that the cross section area $S_2$ of the pore is as follows when a small diameter particle is inserted into the pore formed between five large particles:

$$S_2 = 3.14r^2 = 3.14 \times (0.155R)^2 = 3.14 \times 0.024R^2 = 0.075R^2$$

When the diameter of pore is larger, the sound absorption peak is smaller, and frequency channel is narrower. When the diameter of pore is equal to 0.069 mm, the sound absorption coefficient is maximized. When the pore is further narrowed, the intermediate frequency is poorer. Therefore, the pore with the diameter of 0.07 mm is the best sound absorption pore.

When the diameter of large particle is 0.8 mm, $S_2$=0.012 mm$^2$, which is equivalent to the addition of three small round pores with the diameter of 0.07 mm. It means that the pore formed by filling small particles into 0.8 mm large particles is the same as the pore formed from 0.3 mm particles. Hence, its sound absorption property is better.

When the diameter of the pore is 0.07 mm, the quantity of pore is increased by 3 times, and sound absorption coefficient is reduced at a single peak, and sound absorption property of the whole frequency channel is increased.

Hence, after several experiments, the inventor confirms that the width of the pore formed by filling φ0.15 mm particles into φ0.8-1 mm diameter particles is appropriate for high and low frequency sound absorption effect. The best mixture ratio of this invention is as follows: 80-90 skeleton particles (φ0.8-1 mm) and 10-15 filling particles (φ0.15 mm).

To ensure the pore formed between particles is uniform, the roundness requirements of particles are also very important. Theoretically, the pore formed is maximized when spherical particles are spliced, but the shape of particle used is actually irregular, so the pore formed when irregular particles are spliced, on one hand, will become smaller, and on the other hand, will be partially blocked to form "closed pore". Hence, the total porosity of particulate sound absorption board will become smaller, and many "closed pores" useless for sound absorption will be generated to reduce the acoustic performance of particulate sound absorption board. Therefore, controlling the roundness of particle is very important.

Theoretically, the roundness of particle is represented by angularity coefficient, which is obtained based on the ratio of actual specific surface area of particle and specific surface area of corresponding ideal sphere. Hence, it can represent the derivation degree of particle shape from sphere, which means the larger the angularity coefficient, the more irregular the particle shape, and the more deviated from sphere. To obtain larger porosity and sound absorption pore, the angularity coefficient of particles required for the preparation of sound absorption board should be less than 1.3 so as to ensure the particle is round as far as possible. When the diameter of large particle is 0.8 mm, and 0.15 mm particles are inserted, the area $S_2$ of the pore formed is 0.12 mm, which is equivalent to the addition of three small round pores with the diameter of 0.07 mm. But actual angularity coefficient of particles is generally less than 1.5, so the roundness of particles is adjusted by applying binding agent on the external surface of particles. Particles covered with binding agent are basically round, and its angularity coefficient should be up to 1.3.

Further, to reduce coating thickness, and ensure particles are rounded, the angularity coefficient of sound absorption particle should be less than 1.5. Hence, the selection of the particle with angularity coefficient of less than 1.5 can ensure the thickness of binding agent on the external surface is 0.1-0.2 mm when the angularity coefficient of coated particles is up to 1.3 for the purpose of achieving the best acoustic performance. If the coating (binding agent) is too thick, "teardrops" with be formed on the surface of particles under the action of gravity, and excess teardrops will block the pore, and affect the acoustic performance of particulate sound absorption board; if the coating is too thin, particles won't be rounded easily, and it is difficult to form larger binding area, and binding strength is insufficient. The thickness of binding agent is 0.1-0.2 mm, which can guarantee the binding strength of particles, reduce the dosage of binding agent, and reduce cost.

Figure 3:
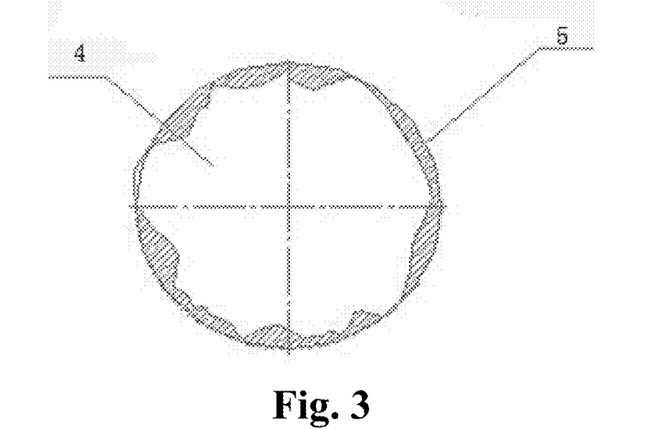
FIG. 3 is the coating diagram of sound absorption particles.

Meanwhile, to form the skeleton by closely splicing sound absorption board particles, and avoid the reduction of porosity of sound absorption board since the pore formed between particles is blocked by binding agent, this invention also provides the preparation method of above particulate sound absorption board, including the following steps:
(1) Take raw materials of sound absorption particles by weight, mix them uniformly and put them into the sealing device, ventilate the sealing device, stir suspended particles, spray binding agent, control the spraying speed of binding agent at 20-40 mg/s, as shown in FIG. 3, uniformly apply 0.1-0.2 mm thick binding agent 5 on the surface of sound absorption particle 4, and form coated particle after drying at room temperature.
(2) Fully stir coated particles obtained from step (1) and curing agent, and put into the mold for vibration and formation.

Wherein, the covering thickness of binding agent on the surface of particles in step (1) is 0.1-0.2 mm.

Such thickness can guarantee the coated particles have necessary binding strength, and prevent the pore from being blocked by thick binding agent so as to reduce the sound absorption property of sound absorption board.

In step (1), the addition amount of binding agent is 3%-10% by weight of block particle.

In step (2), the addition amount of curing agent is determined based on the type and addition amount of binding agent selected.

Preferably, the top of sealing device is connected to the dust collector which shall be first started when compressed air is pumped into the sealing device to remove the mud and dust from raw materials of block particles, and facilitate the uniform coating of particles.

Meanwhile, to ensure particles are firmly spliced, and prevent the pore formed between particles from being blocked by excess binding agent, the component of binding agent and preparation technology of sound absorption board are also very important. The inventor calculates the binding area between particles, and further determines the addition amount of binding agent in the sound absorption board based on the total binding strength required for sound absorption board obtained from calculation, which can prevent the pore formed between particles from being blocked by excess binding agent, reduce the porosity of sound absorption board, save the usage amount of binding agent, and reduce usage cost.

Figure 4:
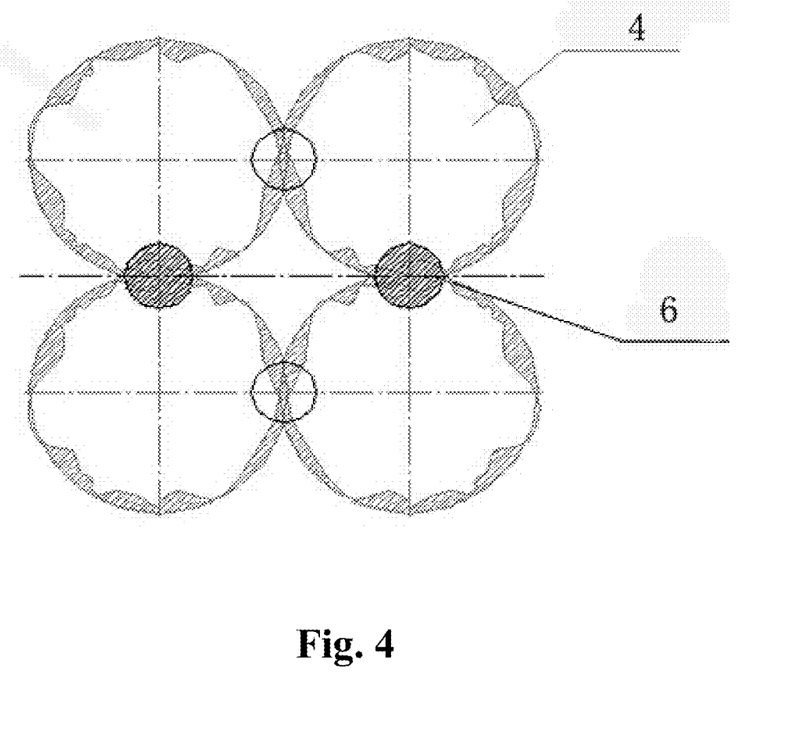
FIG. 4 is the binding diagram of sound absorption particles.

The two-stage manufacturing technology (i.e. coating, curing and then shaping) of sound absorption board of this invention is that particles are uniformly covered with a layer of 0.1-0.2 mm thick binding agent on the surface, and mixed with curing agent and then mutually spliced. Such preparation technology also can prevent the pore formed between particles from being blocked by excess binding agent. Meanwhile, the coating of sound absorption particles of this invention has two advantages: (1) further improve the angularity coefficient of particles to ensure particles are basically spherical, and facilitate the formation of sound absorption pore in the block. In this invention, the sound absorption is achieved by the pore formed by closely splicing particles, so if particles are spherical, it is useful to improve its porosity, but particles are basically multilateral, so angular particles on the surface can be wrapped to be basically spherical; (2) uniform film can form greater binding surface 6 to obtain better mechanical property, as shown in FIG. 4.

Hence, the particulate sound absorption board and its preparation method provided in this invention can guarantee the structure strength of sound absorption board, improve the sound absorption coefficient of sound absorption board, and obtain better sound absorption effect.

Legend: 1. skeleton; 2. connected pore; 3. semi-connected pore; 4. sound absorption particle; 5. binding agent; 6. binding surface; 7. triangle; 8. arch; 9. sector; 10. pore; 11. skeleton particle; 12. filling particle.

SPECIFIC IMPLEMENTATION WAYS

To clearly understand the purpose, technical scheme and beneficial effect, this invention will be further described below in combination with specific embodiments and drawings, but the protection scope of this invention is not limited to the following embodiments.

Figure 1:
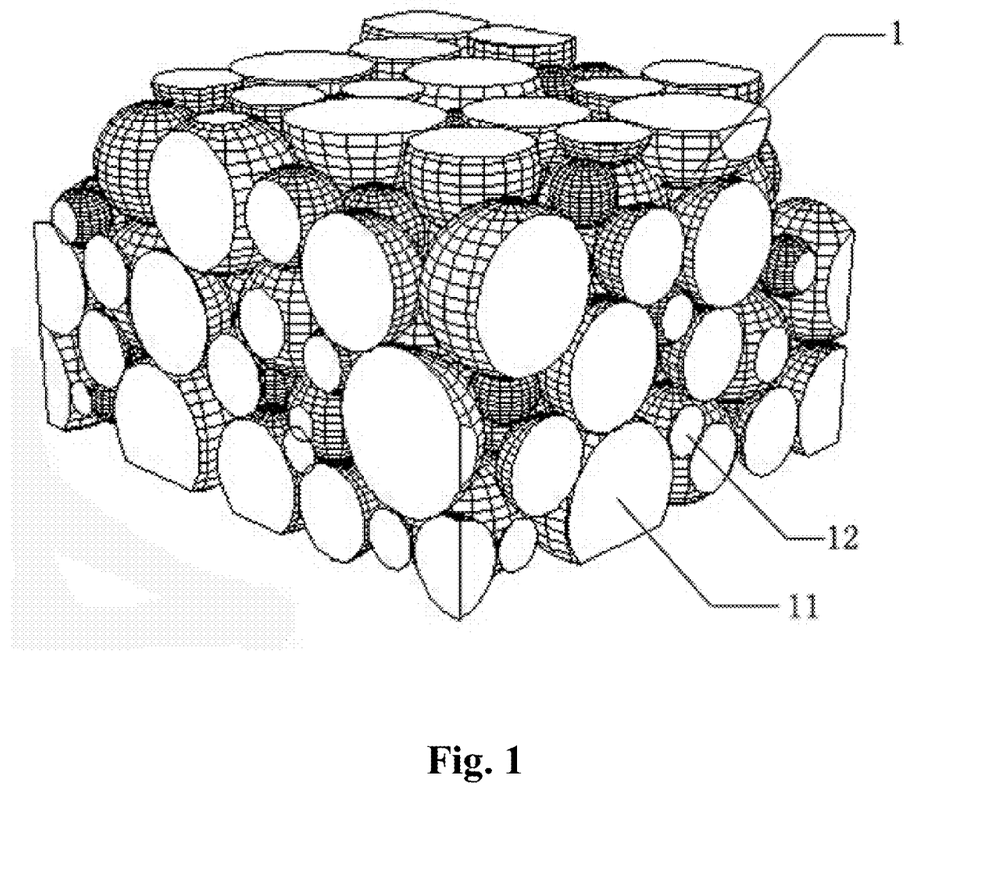
FIG. 1 is the three-dimensional structure diagram of particulate sound absorption board of this invention.
Figure 2:
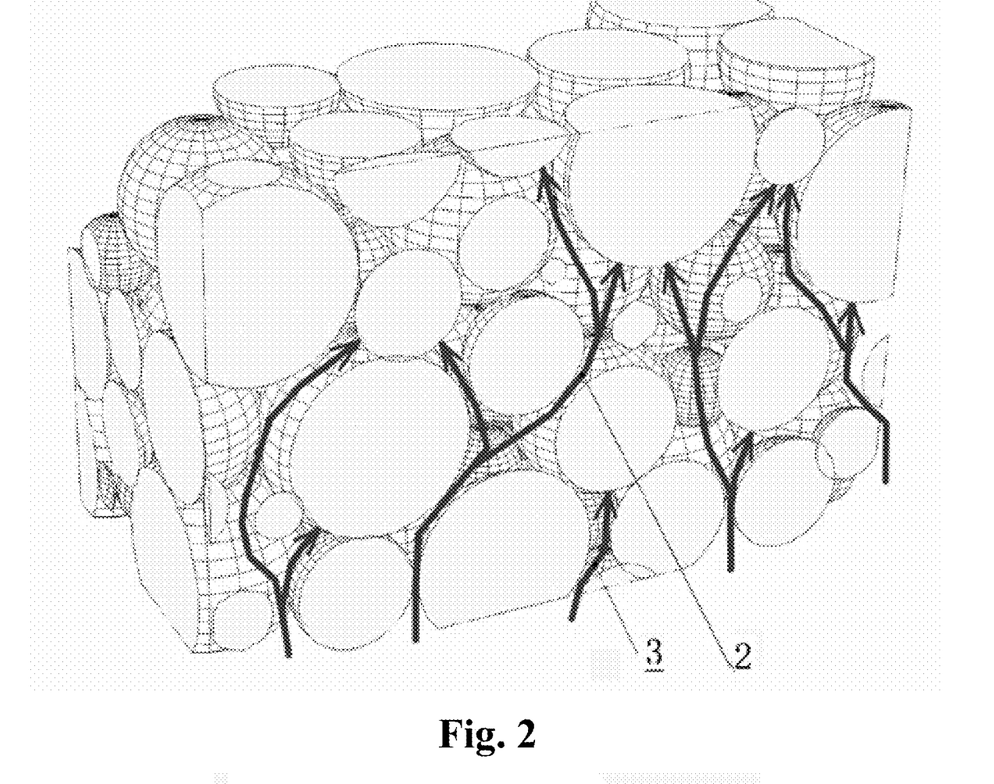
FIG. 2 is the cross section diagram of particulate sound absorption board of this invention.

As shown in FIGS. 1 and 2, the pore of particulate sound absorption board provided in this invention is formed by closely splicing particles of different diameters. The skeleton 1 of sound absorption board is made from skeleton particles 11, and the sound absorption pore is formed by filling a certain proportion of filling particles 12 (thinner particles) into the pore formed between skeletons so as to form a specific micropore structure required for sound absorption. The average diameter of cross section of sound absorption pore is 0.07 mm. When micropore diameter is 0.07 mm, the structure has excellent sound absorption property, including connected pore 2 that can store air and ventilate and semi-connected pore 3 that can store air, but can't ventilate.

Specific manufacturing technology of particulate sound absorption board of this invention is described below with specific embodiments.

Embodiment 1

1. Selection of raw materials: select the wind-blown sand with angularity coefficient of less than 1.5, and screen out ϕ0.8 mm particles with 20-mesh and 25-mesh screens; screen out ϕ0.15 mm particles with 90-mesh and 100-mesh screens.
2. Mixture of raw materials: uniformly mix 90 kg ϕ0.8 mm particles and 10 kg ϕ0.15 mm particles.
3. Covering of binding agent: put the well-mixed raw materials into a sealing device, start the dust collector connected to the top of sealing device, remove the mud and dust from raw materials, and then close; pump compressed air into the bottom of sealing device, stir suspended raw materials, spray epoxy resin binding agent 3 kg, and control the spraying speed of binding agent at 20 mg/s, take out after spraying, and form coated particles after dying at room temperature. Upon inspection, the angularity coefficient of coated particles is less than 1.3, and average thickness of binding agent on the external surface of particles is 0.12 mm.
4. Preparation of 30 mm thick sound absorption board: fully stir coated particles and appropriate curing agent, and then place into 30 mm mold to ensure small particles can flow into the pore formed between large particles in a better way through vibration, and then pressurize, demould to obtain sound absorption board upon the completion of full cross-linking reaction of curing agent.

The strength and sound absorption effect of the said sound absorption board are inspected, and inspection results are shown in the table below.

Embodiment 2

1. Selection of raw materials: select the ceramsite with angularity coefficient of less than 1.5, and screen out ϕ0.8 mm particles with 20-mesh and 25-mesh screens; screen out ϕ0.15 mm particles with 90-mesh and 100-mesh screens.
2. Mixture of raw materials: uniformly mix 90 kg ϕ0.8 mm particles and 10 kg ϕ0.15 mm particles.
3. Covering of binding agent: put the well-mixed raw materials into a sealing device, start the dust collector connected to the top of sealing device, remove the mud and dust from raw materials, and then close; pump compressed air into the bottom of sealing device, stir suspended raw materials, spray phenolic resin binding agent 5 kg, and control the spraying speed of binding agent at 40 mg/s, take out after spraying, and form coated particles after dying at room temperature. Upon inspection, the angularity coefficient of coated particles is less than 1.3, and average thickness of binding agent on the external surface of particles is 0.20 mm.
4. Preparation of 30 mm thick sound absorption board: fully stir coated particles and appropriate curing agent, and then place into 30 mm mold to ensure small particles can flow into the pore formed between large particles in a better way through vibration, and then pressurize, demould to obtain sound absorption board upon the completion of full cross-linking reaction of curing agent.

The strength and sound absorption effect of the said sound absorption board are inspected, and inspection results are shown in the table below.

Embodiment 3

1. Selection of raw materials: select the recycled building waste particle with angularity coefficient of less than 1.5, and screen out ϕ0.8-1 mm particles with 20-mesh and 25-mesh screens; screen out ϕ0.15 mm particles with 90-mesh and 100-mesh screens.
2. Mixture of raw materials: uniformly mix 90 kg ϕ0.8-1 mm particles and 10 kg ϕ0.15 mm particles.
3. Covering of binding agent: put the well-mixed raw materials into a sealing device, start the dust collector connected to the top of sealing device, remove the mud and dust from raw materials, and then close; pump compressed air into the bottom of sealing device, stir suspended raw materials, spray urea resin and furfuryl alcohol resin binding agent 10 kg, and control the spraying speed of binding agent at 30 mg/s, take out after spraying, and form coated particles after dying at room temperature. Upon inspection, the angularity coefficient of coated particles is less than 1.3, and average thickness of binding agent on the external surface of particles is 0.20 mm.
4. Preparation of 30 mm thick sound absorption board: fully stir coated particles and appropriate curing agent, and then place into 30 mm mold to ensure small particles can flow into the pore formed between large particles in a better way through vibration, and then pressurize, demould to obtain sound absorption board upon the completion of full cross-linking reaction of curing agent.

The strength and sound absorption effect of the said sound absorption board are inspected, and inspection results are shown in the table below.

Comparative Embodiment 1

See embodiment 1 for specific operation. It is just that the angularity coefficient of particles selected in step 1 is less than 1.8. Upon inspection, the average thickness of binding agent on the external surface of coated particles is 0.07 mm, and the angularity coefficient of coated particles is less than 1.5.

Comparative Embodiment 2

See embodiment 1 for specific operation. It is just that the angularity coefficient of particles selected in step 1 is less than 1.8. To ensure the angularity coefficient of coated particles is less than 1.3, and dosage of binding agent is increased to 10.5 kg in step 3. Upon inspection, the average thickness of binding agent on the external surface of coated particles is 0.25 mm.

Comparative Embodiment 3

See embodiment 1 for specific operation. It is just that the mixture ratio (the mixture ratio of skeleton particle is unchanged, but the mixture ratio of filling particle is reduced) of raw materials in step 2 is changed as follows: 90 kg ϕ0.8 mm particles and 8 kg ϕ0.15 mm particles. According to the calculation, the dosage of binding agent is 2.94 kg.

Comparative Embodiment 4

See embodiment 1 for specific operation. It is just that the mixture ratio (the mixture ratio of skeleton particle is unchanged, but the mixture ratio of filling particle is increased) of raw materials in step 2 is changed as follows:

90 kg ϕ0.8 mm particles and 20 kg ϕ0.15 mm particles. According to the calculation, the dosage of binding agent is 3.3 kg.

Comparative Embodiment 5

See embodiment 1 for specific operation. It is just that the mixture ratio (the mixture ratio of filling particle is unchanged, but the mixture ratio of skeleton particle is reduced) of raw materials in step 2 is changed as follows: 60 kg ϕ0.8 mm particles and 10 kg ϕ0.15 mm particles. According to the calculation, the dosage of binding agent is 2.1 kg.

Comparative Embodiment 6

See embodiment 1 for specific operation. It is just that the mixture ratio (the mixture ratio of filling particle is unchanged, but the mixture ratio of skeleton particle is increased) of raw materials in step 2 is changed as follows: 100 kg ϕ0.8 mm particles and 10 kg ϕ0.15 mm particles.
According to the calculation, the dosage of binding agent is 3.3 kg.

Comparative Embodiment 7

See embodiment 1 for material selection. It is just that its preparation method is to directly mix, stir and pressurize sound absorption particles, binding agent and curing agent.

Comparative Embodiment 8

See embodiment 1 for specific operation. It is just that only 100 kg ϕ0.8 mm particles are selected.

We compare embodiments and comparative embodiments in this invention as well as the strength and sound absorption effect of commonly used environmentally-friendly sandstone sound absorption brick, expanded perlite sound absorption brick and pottery clay sound absorption brick. See the table below for details:

| S/N (30 mm thick sample) | Compressive Strength at Room Temperature(Mpa) | Sound Absorption Coefficient(NRC) | Dosage of Binding Agent (by weight of raw materials) |
| --- | --- | --- | --- |
| Embodiment 1 | 29 | 0.51(Standing wave tube method) | 3% |
| Embodiment 2 | 29 | 0.50(Standing wave tube method) | 3% |
| Embodiment 3 | 28.5 | 0.50(Standing wave tube method) | 3% |
| Comparative embodiment 1 | 27 | 0.42(Standing wave tube method) | 3% |
| Comparative embodiment 2 | 26.2 | 0.38(Standing wave tube method) | 10% |
| Comparative embodiment 3 | 25 | 0.41(Standing wave tube method) | 3% |
| Comparative embodiment 4 | 26 | 0.35(Standing wave tube method) | 3% |
| Comparative embodiment 5 | 24 | 0.40(Standing wave tube method) | 3% |
| Comparative embodiment 6 | 23 | 0.38(Standing wave tube method) | 3% |
| Comparative embodiment 7 | 23.5 | 0.42(Standing wave tube method) | 11% |
| Comparative embodiment 8 | 23 | 0.37(Standing wave tube method) | 3% |
| Environmentally-friendly sandstone sound absorption brick | 26.1 | 0.38(Standing wave tube method) | 15% |
| expanded perlite sound absorption brick | 0.3-0.35 | 0.73(Reverberation chamber method) | 12% |
| Pottery clay sound absorption brick | 10-12 | 0.47(Standing wave tube method) | 15% |

It can be seen from above results that embodiments 1-3 are the best implementation mode of technical scheme of this invention with high strength, good sound absorption effect and less binding agent dosage, and superior to existing environmentally-friendly sandstone sound absorption brick, expanded perlite sound absorption brick and pottery clay sound absorption brick; it fails to achieve better sound absorption effect even if comparative embodiments 1 and 2 lower the roundness requirements for particles, and comparative embodiments 3-6 correspondingly change the mixture ratio of skeleton particles and filling particles; it still fails to obtain better sound absorption effect when general all-mixed preparation method is used (comparative embodiment 7). In comparative embodiment 8, the sound absorption board is made from particles of the same diameter, but its sound absorption effect and sound absorption bandwidth can't be compared with this invention.

Hence, the technical effect of this invention is achieved based on particle roundness requirements, selection of grading and unique preparation method.

The invention claimed is:
1. A particulate sound absorption board, comprising:
an organic binding agent, sound absorption particles, and sound absorption pores formed between the sound absorption particles,
wherein the sound absorption particles comprise skeleton particles and filling particles, and an angularity coefficient of the sound adsorption particles is less than 1.5,
wherein the organic binding agent is epoxy resin, phenolic resin, urea resin, or furfuryl alcohol resin, wherein the organic binding agent forms a coating over an external surface of the sound absorption particles, and wherein the coating of the organic binding agent—has an average thickness of 0.1-0.2 mm.
2. The particulate sound absorption board according to claim 1, wherein sound absorption pores are formed between the skeleton particles have an average diameter of 0.06-0.09 mm.
3. The particulate sound absorption board according to claim 2, wherein an average diameter the said sound absorption pores is 0.07 mm.

4. The particulate sound absorption board according to claim 1, wherein the size of the skeleton particles is 0.8-1 mm, and the size of the filling particles is 0.15 mm.

5. The particulate sound absorption board according to claim 1, further comprising a curing agent.

6. The particulate sound absorption board according to claim 5, wherein the curing agent causes a cross-linking reaction of the organic binding agent.

7. The particulate sound absorption board according to claim 1, wherein a weight ratio of the skeleton particles and the filling particles is 80-90:10-15.

8. The particulate sound absorption board according to claim 1, wherein the angularity coefficient of sound absorption particle selected is less than 1.3.

9. The particulate sound absorption board according to claim 1, wherein said sound absorption particle is sand, ceramsite, or recycled building waste particle.

10. The particulate sound absorption board according to claim 1, wherein a thickness of the sound absorption board is 10-50 mm.

11. A method of making a particulate sound absorption board of claim 1, comprising:
   (1) adding sound absorption particles of claim 1 in a sealing device, ventilating the sealing device, stirring suspended particles, spraying an organic binding agent at a rate of 20-40 mg/s so as to form a coating of the organic binding agent on an external surface of sound absorption particles, and forming coated particles after drying; and
   (2) mixing coated particles obtained from step (1) and a curing agent to form a mixture, and molding the mixture to the particulate sound absorption board of claim 1.

12. The method of preparing a particulate sound absorption board according to claim 11, wherein a top of said sealing device is connected to a dust collector.

13. The method of preparing a particulate sound absorption board according to claim 11, wherein an amount of the organic binding agent is 3%-10% of the weight of sound absorption particles.

* * * * *